(12) United States Patent
Keates

(10) Patent No.: US 9,537,147 B2
(45) Date of Patent: Jan. 3, 2017

(54) ANODE STRUCTURE HAVING SILICON ELEMENTS

(71) Applicant: INTEL CORPORATION, Santa Clara, CA (US)

(72) Inventor: Andy Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 14/142,789

(22) Filed: Dec. 28, 2013

(65) Prior Publication Data

US 2015/0188130 A1 Jul. 2, 2015

(51) Int. Cl.
*H01M 4/38* (2006.01)

(52) U.S. Cl.
CPC .................................. *H01M 4/386* (2013.01)

(58) Field of Classification Search
CPC .................................................... H01M 4/386
See application file for complete search history.

(56) References Cited

U.S. PATENT DOCUMENTS

| | | | |
|---|---|---|---|
| 7,751,994 B2 | 7/2010 | Matsumura et al. | |
| 7,795,843 B2 | 9/2010 | Keates et al. | |
| 7,852,045 B2 | 12/2010 | Matsumura et al. | |
| 8,282,774 B2 | 10/2012 | Tan et al. | |
| 8,865,345 B1* | 10/2014 | Ramasubramanian | C25D 13/12 |
| | | | 429/163 |
| 2006/0115735 A1* | 6/2006 | Yasuda | H01M 4/0452 |
| | | | 429/233 |
| 2008/0122290 A1 | 5/2008 | Li et al. | |
| 2011/0234151 A1 | 9/2011 | Uan-Zo-Li et al. | |

OTHER PUBLICATIONS

Matthew T. McDowell et al.; "In Situ TEM of Two-Phase Lithiation of Amorphous Silicon Nanospheres;" Nano Letters, ACS Publications, dx.doi.org/10.1021/nl3044508 /Nano Lett. XXXX, XXX, XXX-XX, pp. A-F. Received: Dec. 3, 2012, Revised Jan. 3, 2013.

* cited by examiner

*Primary Examiner* — Rena L Dye
(74) *Attorney, Agent, or Firm* — KED & Associates LLP

(57) ABSTRACT

An anode structure may include a first bus bar having a first conductive coating, a second bus bar having a second conductive coating, and a plurality of silicon elements between the first bus bar and the second bus bar with a first void between a first one of the silicon elements and a second one of the silicon elements. Additionally, at least the first one of the silicon elements to expand into the first void.

25 Claims, 4 Drawing Sheets

ANODE STRUCTURE HAVING SILICON ELEMENTS

BACKGROUND

1. Field

Embodiments may relate to a battery or battery cell having a silicon anode (or anode structure).

2. Background

A battery may include an anode, a cathode and an electrolyte between the anode and the cathode. The anode (or negative electrode) may be negatively charged and the anode may be where charge carriers may accumulate in order to provide power to an electronic device. The anode may be a terminal where current flows into a battery (or battery cell) from outside of the battery. In other words, a positive current may flow into an anode. The cathode (or positive electrode) may provide a positive charge, which may compel electrons to travel from the anode to the positive charge. The cathode may be a terminal where current flows out of the battery (or battery cell). In other words, the positive current may flow out from the cathode. The electrolyte may keep the electrons from traveling between the anode and the cathode through the internal battery structure.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Figure 1:
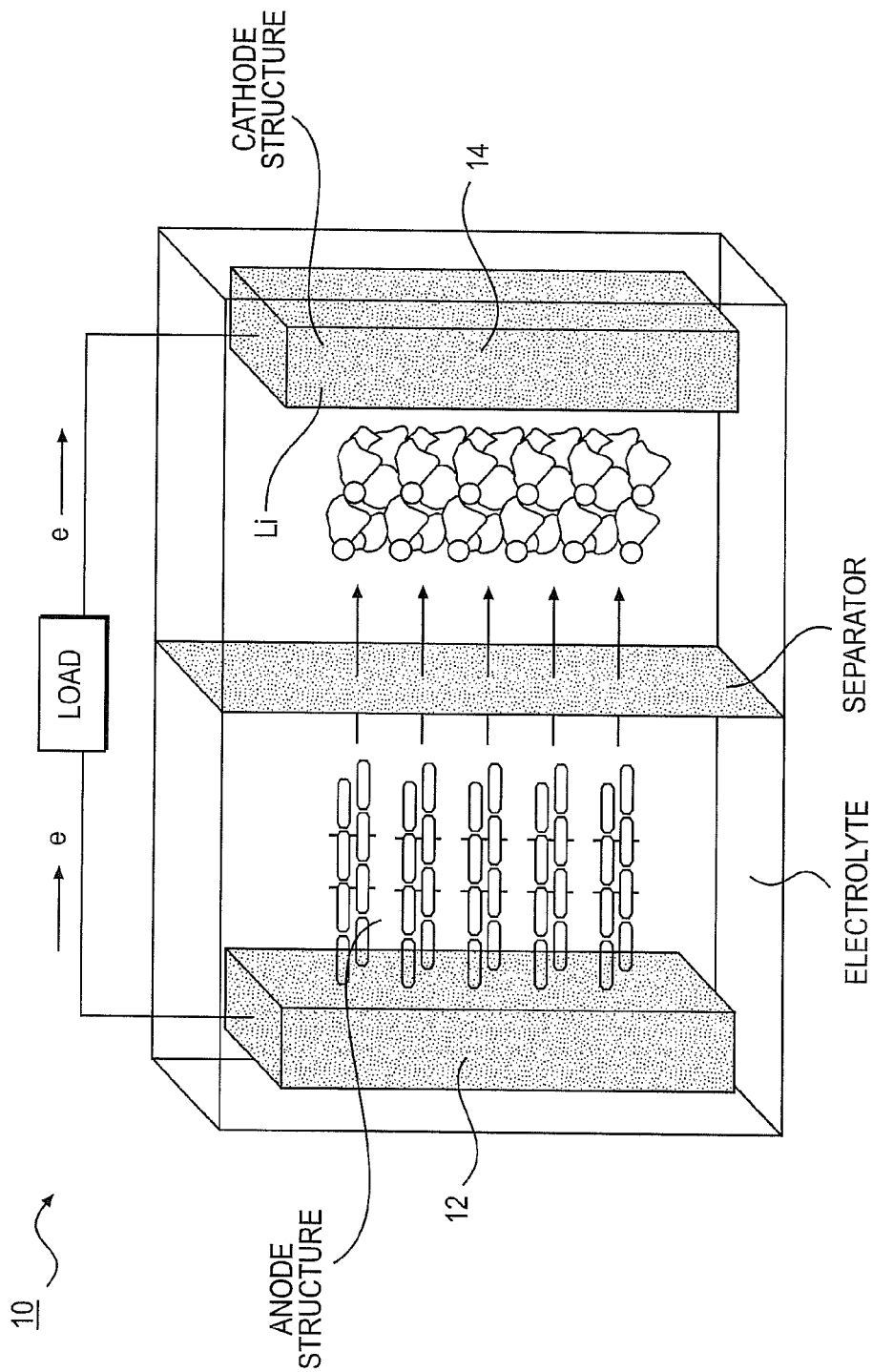
FIG. 1 shows an example of a battery according to an example arrangement.

FIG. 1 shows an example of a battery according to an example arrangement. Other arrangements may also be provided.

FIG. 1 shows a battery 10 that includes an anode 12 (or anode structure) and a cathode 14. The battery 10 may also include an electrolyte in a structure between the anode 12 and the cathode 14. A separator may be provided between the anode 12 and the cathode 14.

The battery 10 may be used in an electronic device to provide stored energy to the electronic device. In order to store more energy, the anode or the cathode may be designed to store more energy. The electronic device may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), etc.

During operation, current may flow into the anode 12 (of the battery 10) from a power source, such as a battery charger or an AC/DC (alternate current/direct current) converter. The current may flow out from the cathode 14 (of the battery 10) in order to provide power (or energy) to other components, such as the load, of the electronic device.

In order to store more power in a battery, a structure of the anode or the cathode may be designed to store more energy. For example, an anode or an anode structure may be made of carbon or graphite. As another example, the anode or the anode structure may be made of silicon. Silicon may have a much better energy absorption rate as compared to carbon or graphite. Accordingly, silicon may be used for the anode structure.

In a carbon structure for the anode (or anode structure), lithium ions may be provided to the carbon structure. The ions may be provided between layers of the carbon, and the carbon may expand. On the other hand, in a silicon structure for the anode, lithium ions may be provided to the silicon structure. The ions may be incorporated into a lithium/silicon compound, and the silicon may expand at a greater rate. The expansion of the silicon may cause stress and fracture of silicon, and may lead to rapid degradation of a silicon anode as a battery cell component.

Embodiments may provide an anode structure that may expand in a predictable manner in order to fill voids (or gaps) between silicon elements. The anode structure may be designed such that when the silicon elements are fully lithiated, then most of the voids may be closed out and the lithiated structure may approximate a solid block of fully lithiated silicon.

Embodiments may provide a structure in which silicon elements may expand and contract in a predictable manner while avoiding (or reducing) fracturing. For example, the battery may be "breathing" as the battery is being charged (lithium ions are inserted and the silicon elements expand) and the battery is being discharged (lithium ions extracted and the silicon elements are contracted).

Embodiments may provide the silicon elements in a fixed pattern to form a plurality of voids in a fixed pattern.

Embodiments may add lithium ions into a silicon structure such that the gaps or voids are filled (by expansion of the silicon or silicon elements). The lithium ions may be added to the silicon or silicon elements during a charging process. The silicon elements may expand into the voids (having the fixed pattern).

Figure 2:
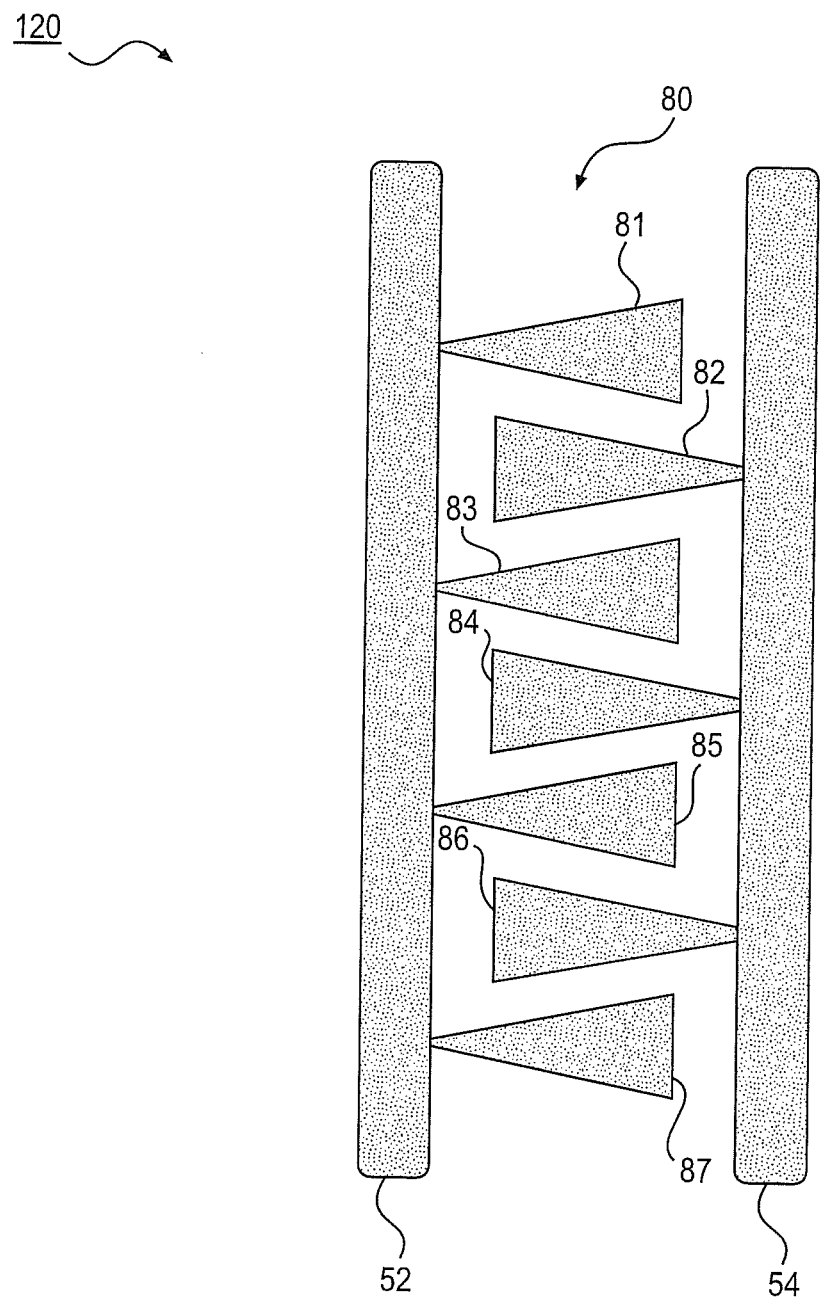
FIG. 2 shows an anode structure having silicon elements according to an example embodiment.

FIG. 2 shows an anode structure having silicon elements according to an example embodiment. Other embodiments and configurations may also be provided.

FIG. 2 shows an anode structure 120 that may correspond to the anode 12 (FIG. 1).

The anode structure 120 may include a first bus bar 52 (or first conductor) and a second bus bar 54 (or second conductor). The first bus bar 52 and the second bus bar 54 may be used to conduct electrons away from an anode structure. The first bus bar 52 may be a first metal conductor. The second bus bar 54 may be a second metal conductor.

As shown in FIG. 2, silicon elements 80 (or silicon) may be provided between the first bus bar 52 and the second bus bar 54. In FIG. 2, the silicon elements 80 may be non-lithiated silicon. As shown in FIG. 2, a tip of each portion of the silicon elements 80 may be coupled to either the first bus bar 52 or the second bus bar 54. For example, FIG. 2 shows silicon wedges that may be attached to the first or second bus bar 52, 54, such as a metal bar bus with a conductive metal coating. The silicon elements may be in a triangular shape, and may contact one of the bus bars 52, 54.

As one example, FIG. 2 shows the silicon elements 80 includes first silicon element 81, second silicon element 82, third silicon element 83, fourth silicon element 84, fifth silicon element 85, sixth silicon element 86 and seventh silicon element 87. A tip of each of the first silicon element 81, the third silicon element 83, the fifth silicon element 85 and the seventh silicon element 87 may contact (or be coupled or attached) to the first bus bar 52. A tip of each of the second silicon element 82, the fourth silicon element 84, and the sixth silicon element 86 may contact (or be coupled or attached) to the second bus bar 54.

FIG. 2 also shows that a void (or space) may be provided between the first silicon element 81 and the second silicon element 82, a void (or space) may be provided between the second silicon element 82 and the third silicon element 83, and a void (or space) may be provided between the third silicon element 83 and the fourth silicon element 84.

FIG. 2 also shows that a void (or space) may be provided between the fourth silicon element 85 and the fifth silicon element 85, a void (or space) may be provided between the fifth silicon element 85 and the sixth silicon element 86, and a void (or space) may be provided between the sixth silicon element 86 and the seventh silicon element 87.

Each of the first through seventh silicon elements 81-87 may be individually and separately called a silicon storage element (or silicon element).

Figure 3:
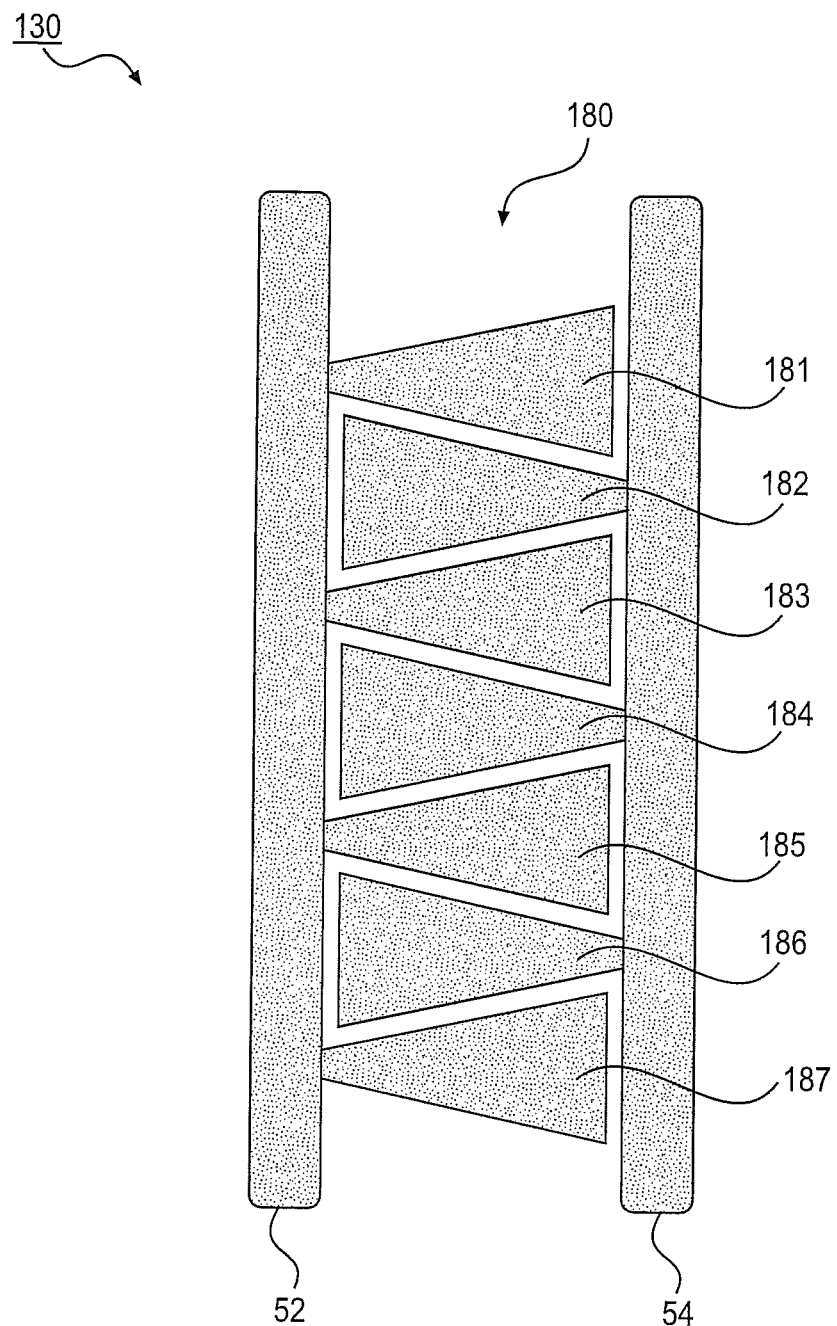
FIG. 3 shows an anode structure having lithiated silicon elements according to an example embodiment.

FIG. 3 shows an anode structure having lithiated silicon elements (or silicon) according to an example embodiment. Other embodiments and configurations may also be provided.

The embodiment of FIG. 3 is intended to show that silicon elements may expand when lithiated (i.e., lithium ions are provided). The expansion may fill voids (or gaps) in the silicon (or silicon elements). The silicon elements (in the fixed pattern) may expand into the voids (in the fixed pattern).

FIG. 3 shows an anode structure 130 that may correspond to the anode 12 (FIG. 1).

The anode structure 130 may include the first bus bar 52 and the second bus bar 54. The first bus bar 52 and the second bus bar 54 may be used to conduct electrons away from the anode structure 130.

As shown in FIG. 3, silicon elements may be provided between the first bus bar 52 and the second bus bar 54, and then the silicon elements may be lithiated in order to provide lithiated silicon elements 180 between the first bus bar 52 and the second bus bar 54. In FIG. 3, the silicon elements 180 may be lithiated from the silicon elements 80 of FIG. 2. The lithiation of the silicon elements 80 may cause the silicon to expand and to fill the void (or space) between the respective silicon elements.

For example, FIG. 3 shows a reduced void (or space) between the first silicon element 181 and the second silicon element 182, a reduced void (or space) between the second silicon element 182 and the third silicon element 183, and a reduced void (or space) between the third silicon element 183 and the fourth silicon element 184.

FIG. 3 also shows that a reduced void (or space) between the fourth silicon element 184 and the fifth silicon element 185, a reduced void (or space) between the fifth silicon element 185 and the sixth silicon element 186, and a reduced void (or space) between the sixth silicon element 186 and the seventh silicon element 187.

The first through seventh silicon elements 181-187 may also be individually considered a silicon storage element.

In at least one embodiment, an anode structure may be obtained by etching a structure from a silicon wafer. A plurality of conductive bus bars (or metal layers) may be provided as metal layers (such as the first and second conductors). The bus bars may then be protected from the lithiation by the conductive metal layer. The exposed anode storage elements (i.e., the silicon elements) have no conductive coating and may absorb the lithium ions.

In at least one embodiment, the silicon anode may be used rather than a carbon anode. Rather than using a layered hexagonal atomic structure of carbon atoms, an array of expandable silicon elements may store the lithium ions received from the electrolyte during the charging process. A metal current collection (such as on right side of FIG. 1) may be replaced by a junction of bus bars (such as the first and second conductors 52, 54 in FIG. 2). As one example, the bus bars at a micro level may be vertically provided, and may be joined at edges of the structure by a bus bar provided horizontally.

Figure 4:
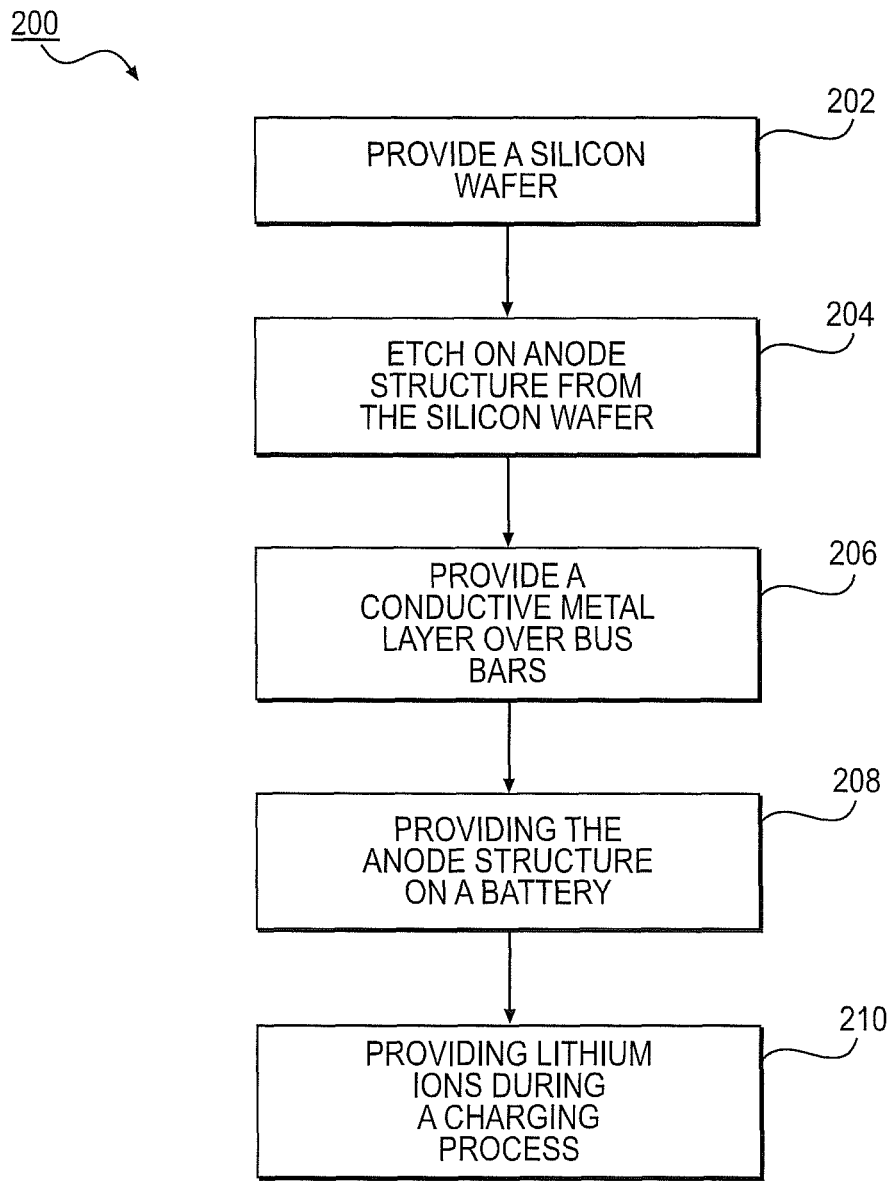
FIG. 4 is a flowchart showing operations of providing an anode structure having lithiated silicon elements according to an example embodiment.

FIG. 4 is a flowchart showing operations of providing an anode structure having lithiated silicon elements according to an example embodiment. Other operations, orders of operations and embodiments may also be provided.

FIG. 4 is a flowchart 200 showing a methodology of providing a lithiation of a silicon anode structure. In operation 202, a silicon wafer may be provided. An anode structure (or a plurality of bus bars) may be etched in the silicon in operation 204. A conductive metal layer may be provided over each of the bus bars in operation 206.

The anode structure may have at least two bus bars and a plurality of silicon elements. The anode structure and the cathode structure may be provided to form a battery in operation 208.

During a charging process in operation 210, lithium ions may be provided to the silicon elements. The exposed silicon elements may expand into the voids based on the lithium ions. This may fill voids (or partially fill voids) between the silicon elements.

The following examples pertain to further embodiments.

Example 1 is an anode structure comprising: a first bus bar having a first conductive coating, a second bus bar having a second conductive coating, and a plurality of silicon elements between the first bus bar and the second bus bar with a first void between a first one of the silicon elements and a second one of the silicon elements, and at least the first one of the silicon elements to expand into the first void.

In Example 2, the subject matter of Example 1 can optionally include that the first one of the silicon elements to expand and to reduce the first void between the first one of the silicon elements and the second one of the silicon elements.

In Example 3, the subject matter of Example 1 can optionally include that the first one of the silicon elements to expand in response to receiving at least one lithium ion.

In Example 4, the subject matter of Example 1 and Example 3 can optionally include that the at least one lithium ion to be provided to the silicon elements during a charging process.

In Example 5, the subject matter of Example 1 can optionally include that the plurality of silicon elements include the second one of the silicon elements and a third one of the silicon elements with a second void between the second one of the silicon elements and the third one of the silicon elements, and the second one of the silicon elements to expand into the second void.

In Example 6, the subject matter of Example 1 and Example 6 can optionally include that the second one of the silicon elements to expand in response to receiving at least one lithium ion.

In Example 7, the subject matter of Example 1 can optionally include that the first one of the silicon elements is in a triangular shape, and the first one of the silicon elements to contact the first bus bar.

In Example 8, the subject matter of Example 1 and Example 7 can optionally include that the second one of the silicon elements is in a triangular shape, and the second one of the silicon elements to contact the second bus bar.

In Example 9, the subject matter of Example 1 and Example 7 can optionally include that the plurality of silicon elements are in a fixed pattern.

Example 10 is a battery comprising: a cathode structure, and an anode structure including: a first bus bar, a second bus bar, and a plurality of silicon elements between the first bus bar and the second bus bar, and the plurality of silicon elements to form a first void between a first one of the silicon elements and a second one of the silicon elements, and at least the first one of the silicon elements to expand into the first void.

In Example 11, the subject matter of Example 10 and Example 3 can optionally include that the first one of the silicon elements to expand and to reduce the first void between the first one of the silicon elements and the second one of the silicon elements.

In Example 12, the subject matter of Example 10 can optionally include that the first one of the silicon elements to expand in response to receiving at least one lithium ion.

In Example 13, the subject matter of Example 10 and Example 12 can optionally include that the at least one lithium ion to be provided to the silicon elements during a charging process.

In Example 14, the subject matter of Example 10 can optionally include that the plurality of silicon elements to form a second void between the second one of the silicon elements and a third one of the silicon elements, and the second one of the silicon elements to expand into the second void.

In Example 15, the subject matter of Example 10 and Example 14 can optionally include that the second one of the silicon elements to expand in response to receiving at least one lithium ion.

In Example 16, the subject matter of Example 10 can optionally include that the first one of the silicon elements is in a triangular shape, and the first one of the silicon elements to contact the first bus bar.

In Example 17, the subject matter of Example 10 and Example 16 can optionally include that the second one of the silicon elements is in a triangular shape, and the second one of the silicon elements to contact the second bus bar.

In Example 18, the subject matter of Example 10 can optionally include that the plurality of silicon elements are in a fixed pattern.

Example 19 is a method of a battery comprising: providing an anode structure having a first bus bar, a second bus bar, and a plurality of silicon elements with a first void between a first one of the silicon elements and a second one of the silicon elements, providing lithium ions to the silicon elements, and expanding at least the first one of the silicon elements into the first void.

In Example 20, the subject matter of Example 19 can optionally include that expanding at least the first one of the silicon elements to reduce the first void between the first one of the silicon elements and the second one of the silicon elements.

In Example 21, the subject matter of Example 19 can optionally include that expanding at least the first one of the silicon elements to occur in response to receiving at least one of the lithium ions.

In Example 22, the subject matter of Example 19 can optionally include that providing the lithium ions is to be provided during a charging process.

In Example 23, the subject matter of Example 19 can optionally include expanding at least the second one of the silicon elements into a second void between the second one of the silicon elements and a third one of the silicon elements.

In Example 24, the subject matter of Example 19 and Example 23 can optionally include that expanding at least the second one of the silicon elements to occur in response to receiving at least one of the lithium ions.

In Example 25, the subject matter of Example 19 can optionally include that the first one of the silicon elements is in a triangular shape, and the first one of the silicon elements to contact the first bus bar.

In Example 26, the subject matter of Example 19 and Example 25 can optionally include that the second one of the silicon elements is in a triangular shape, and the second one of the silicon elements to contact the second bus bar.

In Example 27, the subject matter of Example 19 can optionally include that the plurality of silicon elements are in a fixed pattern.

Example 28 is a method of forming an anode structure, comprising: providing a silicon structure having a plurality of silicon elements with a first void between a first one of the silicon elements and a second one of the silicon elements, providing a first bus bar and a second bus bar at the silicon structure, providing a first conductive layer at the first bus bar, providing a second conductive layer at the second bus bar, and expanding at least a first one of the silicon elements into the first void between the first one of the silicon elements and the second one of the silicon elements.

In Example 29, the subject matter of Example 28 can optionally include that expanding at least the first one of the silicon elements to reduce the first void between the first one of the silicon elements and the second one of the silicon elements.

In Example 30, the subject matter of Example 28 and Example 29 can optionally include that expanding at least the first one of the silicon elements to occur in response to receiving at least one lithium ion.

In Example 31, the subject matter of Example 28 and Example 30 can optionally include that the at least one lithium ion to be provided during a charging process.

In Example 32, the subject matter of Example 28 can optionally include expanding at least the second one of the silicon elements into a second void between the second one of the silicon elements and a third one of the silicon elements.

In Example 33, the subject matter of Example 28 and Example 32 can optionally include that expanding at least the second one of the silicon elements to occur in response to receiving at least one lithium ion.

In Example 34, the subject matter of Example 28 can optionally include that the first one of the silicon elements is in a triangular shape, and the first one of the silicon elements to contact the first bus bar.

In Example 35, the subject matter of Example 28 and Example 34 can optionally include that the second one of the silicon elements is in a triangular shape, and the second one of the silicon elements to contact the second bus bar.

In Example 36, the subject matter of Example 28 can optionally include that the plurality of silicon elements are in a fixed pattern.

Example 37 is an anode structure comprising: a first bus bar having a first conductive coating, a second bus bar having a second conductive coating, and a plurality of silicon elements provided in a fixed pattern between the first bus bar and the second bus bar to form a plurality of voids in a fixed pattern, at least a first one of the silicon elements to expand into a first one of the voids, and at least a second one of the silicon elements to expand into a second one of the voids.

In Example 38, the subject matter of Example 37 can optionally include that the first one of the silicon elements to expand and to reduce the first one of the voids, and the second one of the silicon elements to expand and to reduce the second one of the voids.

In Example 39, the subject matter of Example 37 can optionally include that the first one of the silicon elements to expand in response to receiving at least one lithium ion.

In Example 40, the subject matter of Example 37 and Example 39 can optionally include that the at least one lithium ion to be provided to the silicon elements during a charging process.

In Example 41, the subject matter of Example 37 can optionally include that the first one of the silicon elements is in a triangular shape, and the first one of the silicon elements to contact the first bus bar.

In Example 42, the subject matter of Example 37 and Example 41 can optionally include that the second one of the silicon elements is in a triangular shape, and the second one of the silicon elements to contact the second bus bar.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An anode structure comprising:
   a first bus bar having a first conductive coating;
   a second bus bar having a second conductive coating; and
   a plurality of silicon elements between the first bus bar and the second bus bar with a first void between a first one of the silicon elements and a second one of the silicon elements, and at least the first one of the silicon elements to expand into the first void, wherein the first one of the silicon elements is in a triangular shape, and the first one of the silicon elements to contact the first bus bar, wherein the second one of the silicon elements is in a triangular shape, and the second one of the silicon elements to contact the second bus bar.

2. The anode structure of claim 1, wherein the first one of the silicon elements to expand and to reduce the first void between the first one of the silicon elements and the second one of the silicon elements.

3. The anode structure of claim 1, wherein the first one of the silicon elements to expand in response to receiving at least one lithium ion.

4. The anode structure of claim 3, wherein the at least one lithium ion to be provided to the silicon elements during a charging process.

5. The anode structure of claim 1, wherein the plurality of silicon elements include the second one of the silicon elements and a third one of the silicon elements with a second void between the second one of the silicon elements and the third one of the silicon elements, and the second one of the silicon elements to expand into the second void.

6. The anode structure of claim 5, wherein the second one of the silicon elements to expand in response to receiving at least one lithium ion.

7. The anode structure of claim 1, wherein a tip of the first one of the silicon elements to contact the first bus bar.

8. The anode structure of claim 7, wherein a tip of the second one of the silicon elements to contact the second bus bar.

9. The anode structure of claim 1, wherein the plurality of silicon elements are in a fixed pattern.

10. A battery comprising:
    a cathode structure; and
    an anode structure including:
      a first bus bar;
      a second bus bar; and
      a plurality of silicon elements between the first bus bar and the second bus bar, and the plurality of silicon elements to form a first void between a first one of the silicon elements and a second one of the silicon elements, and at least the first one of the silicon elements to expand into the first void, wherein the first one of the silicon elements is in a triangular shape, and the first one of the silicon elements to contact the first bus bar, wherein the second one of the silicon elements is in a triangular shape, and the second one of the silicon elements to contact the second bus bar.

11. The battery of claim 10, wherein the first one of the silicon elements to expand and to reduce the first void between the first one of the silicon elements and the second one of the silicon elements.

12. The battery of claim 10, wherein the first one of the silicon elements to expand in response to receiving at least one lithium ion.

13. The battery of claim 12, wherein the at least one lithium ion to be provided to the silicon elements during a charging process.

14. The battery of claim 10, wherein the plurality of silicon elements to form a second void between the second one of the silicon elements and a third one of the silicon elements, and the second one of the silicon elements to expand into the second void.

15. The battery of claim 14, wherein the second one of the silicon elements to expand in response to receiving at least one lithium ion.

16. The battery of claim 10, wherein a tip of the first one of the silicon elements to contact the first bus bar.

17. The battery of claim 16, wherein a tip of the second one of the silicon elements to contact the second bus bar.

18. The battery of claim 10, wherein the plurality of silicon elements are in a fixed pattern.

19. A method of a battery comprising:
providing an anode structure having a first bus bar, a second bus bar, and a plurality of silicon elements with a first void between a first one of the silicon elements and a second one of the silicon elements, wherein the first one of the silicon elements is in a triangular shape, and the first one of the silicon elements to contact the first bus bar, wherein the second one of the silicon elements is in a triangular shape, and the second one of the silicon elements to contact the second bus bar;
providing lithium ions to the silicon elements; and
expanding at least the first one of the silicon elements into the first void.

20. The method of claim 19, wherein expanding, in response to receiving at least one of the lithium ions, at least the first one of the silicon elements to reduce the first void between the first one of the silicon elements and the second one of the silicon elements.

21. The method of claim 19, wherein providing the lithium ions is to be provided during a charging process.

22. The method of claim 19, further comprising expanding, in response to receiving at least one of the lithium ions, at least the second one of the silicon elements into a second void between the second one of the silicon elements and a third one of the silicon elements.

23. The method of claim 19, wherein a tip of the first one of the silicon elements to contact the first bus bar.

24. The method of claim 23, wherein a tip of the second one of the silicon elements to contact the second bus bar.

25. The method of claim 19, wherein the plurality of silicon elements are in a fixed pattern.

* * * * *